(12) United States Patent
Ding et al.

(10) Patent No.: US 9,628,939 B2
(45) Date of Patent: Apr. 18, 2017

(54) DATA CALLING METHOD AND DEVICE (71) Applicant: BEIJING QIHOO TECHNOLOGY COMPANY LIMITED, Xicheng, Beijing (CN)

(72) Inventors: Yi Ding, Beijing (CN); Yuan Li, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 0 days.

(21) Appl. No.: 14/368,550

(22) PCT Filed: Dec. 24, 2012

(86) PCT No.: PCT/CN2012/087296
§ 371 (c)(1),
(2) Date: Jun. 25, 2014

(87) PCT Pub. No.: WO2013/097673
PCT Pub. Date: Jul. 4, 2013

(65) Prior Publication Data
US 2014/0378100 A1    Dec. 25, 2014

(30) Foreign Application Priority Data
Dec. 27, 2011    (CN) .......................... 2011 1 0444060

(51) Int. Cl.
*H04W 4/00* (2009.01)
*H04W 12/08* (2009.01)
(Continued)

(52) U.S. Cl.
CPC ........... *H04W 4/003* (2013.01); *H04W 8/205* (2013.01); *H04W 12/02* (2013.01); *H04W 12/08* (2013.01)

(58) Field of Classification Search
CPC ..... H04W 12/02; H04W 12/08; H04W 4/003; H04W 12/06; G06F 21/6218; G06F 21/10;
(Continued)

(56) References Cited

U.S. PATENT DOCUMENTS

2004/0064572 A1* 4/2004 Yamaguchi ......... G06F 21/6218
709/229
2009/0141895 A1* 6/2009 Anderson ............... G06F 21/84
380/252
(Continued)

OTHER PUBLICATIONS

Zhou, Y. et al, Taming Information Stealing Smartphone Applications (on Android), Trust and Trustworthy Computing, 2011, pp. 93-107, vol. 6740.*

(Continued)

*Primary Examiner* — George Eng
*Assistant Examiner* — Hung Du
(74) *Attorney, Agent, or Firm* — James M. Stipek; John R. Bednarz; Polsinelli PC (57) ABSTRACT

The present invention discloses a data calling method and device, wherein the data calling method comprises: receiving a service request to use a first service, wherein the first service needs to use private data of a mobile terminal, and the service request comprises a service name of the first service; according to the service name, sending to a user of the mobile terminal a prompt about whether to permit the first service to use the private data; according to the user's input, determining that the requesting first service is permitted to use the private data; determining a jump service name corresponding to the service name, and calling the first service according to the jump service name, wherein the jump service name is a service name resulting from modification to the service name of the first service in a service listing maintained by the system whenever the mobile
(Continued)

terminal is activated, and the jump service name is different from service names of other services except for the first service in the service listing. Safety of the private data of the mobile terminal is improved through the present application.

13 Claims, 5 Drawing Sheets

(51) Int. Cl.
*H04W 8/20* (2009.01)
*H04W 12/02* (2009.01)

(58) Field of Classification Search
CPC .. G06F 21/51; G06F 17/3089; G06F 21/6245; G06F 21/6254; G06F 21/6263; G06F 21/6272; G06F 21/6281; G06F 21/629
See application file for complete search history.

(56) References Cited

U.S. PATENT DOCUMENTS

2009/0320090 A1   12/2009   Hungerford et al.
2012/0246484 A1*  9/2012    Blaisdell ................ G06F 21/52
                                                713/189

OTHER PUBLICATIONS

English translation of Abstract only of Chinese Application No. CN1484926A, Publication date Mar. 24, 2004, country: China, Inventors: J. Cail et al, Title: A Method of Invoking Privacy, one page.
English translation of Abstract only of Chinese Application No. CN102186167A, Publication date Sep. 14, 2011, country: China, Inventors: Xueqin Liu, Title: Method and system for Monitoring Applications, one page.
English translation of Abstract only of Chinese Application No. CN102572804A, Publication date Jul. 11, 2012, country: China, Inventors: Yi Ding et al, Title: Data Calling Method and Device, one page.
Zhou, Y. et al, Taming Information-Stealing Smartphone Applications (on Android), Trust and Trustworthy Computing, 2011, pp. 93-107, vol. 6740.
International Search Report regarding PCT/CN2012/087296 issued Apr. 4, 2013, 4 pages.

* cited by examiner

DATA CALLING METHOD AND DEVICE

FIELD OF THE INVENTION

The present invention relates to the technical field of communications, and particularly to a data calling method and a device for calling private data.

BACKGROUND OF THE INVENTION

As communication technologies develop, a mobile terminal such as a mobile phone has already become a requisite article in people's daily life. To meet people's increasing needs for use, a mobile terminal manufacturer and a mobile service provider provide more and more application services for people. However, many application services, without notice of a user, collect the user's private information and threaten the user's security in use. Particularly a mobile terminal such as a mobile phone having richer and richer applications and functions currently stores a lot of private data of the user, so it is necessary to protect the private data.

Taking mobile phone as an example, currently, an operating system has certain requirements for each APP (application) among applications in the mobile phone. If a certain application needs to read the user's private data (such as contacts or short messages, etc.), a prompt pops up upon installation of the application to inform the user that the application needs to use the user's private data, and if the user agrees, the application can be installed. However, after the installation, the application will not be interrupted upon using the private data at any time, and the user will not be informed that the user's private data are being used.

That is to say, for an application, it needs to apply to the operating system for a right to use private data, and the applying and a right granting procedure are accomplished during installation of the application. Thereafter, how to use the private data, when to use the private data, what private data to be used and the like become the application's own business, and the system no longer performs supervision and management and no longer sends an alarm or prompt to the user.

However, such protection of user's private data is obviously insufficient. Since in fact authorization is requested only upon installation and supervision and management is not performed any more in subsequent use, the user cannot learn about use of the private data by the application, nor learn about how to use or under what circumstances to use the private data so that leakage of the user's private data might be caused. Therefore, it is very necessary to provide prompt and protection whenever the application accesses to the private data to enhance protection for the user's private data and safeguard the user's safety during use of the application.

SUMMARY OF THE INVENTION

In view of the above problems, the present invention is proposed to provide a private data calling method and device, which overcome the above problems or at least partially solve or mitigate the above problems.

According to an aspect of the present invention, there is provided a data calling method, comprising: receiving a service request to use a first service, wherein, the first service needs to use private data of a mobile terminal, and the service request comprises a service name of the first service; according to the service name, sending to a user of the mobile terminal a prompt about whether to permit the first service to use the private data; according to the user's input, determining that the requesting first service is permitted to use the private data; determining a jump service name corresponding to the service name, and calling the first service according to the jump service name, wherein the jump service name is a service name resulting from modification to the service name of the first service in a service listing maintained by the system whenever the mobile terminal is activated, and the jump service name is different from service names of other services except for the first service in the service listing.

According to another aspect of the present invention, there is provided a data calling device, comprising: a receiving module configured to receive a service request to use a first service, wherein, the first service needs to use private data of a mobile terminal, and the service request comprises a service name of the first service; a prompting module configured to, according to the service name, send to a user of the mobile terminal a prompt about whether to permit the first service to use the private data; a confirming module configured to, according to the user's input, confirm that the requesting first service is permitted to use the private data; an calling module configured to determine a jump service name corresponding to the service name after the determining module determines that the requesting first service is permitted to use the private data, and call the first service according to the jump service name, wherein the jump service name is a service name resulting from modification to the service name of the first service in the service listing maintained by the system whenever the mobile terminal is activated, and the jump service name is different from service names of other services except for the first service in the service listing.

According to yet another aspect of the present invention, there is provided a computer program comprising a computer readable code, wherein, when the computer readable code runs on a server, the server is caused to execute the data calling method.

According to a further aspect of the present invention, there is provided a computer readable medium which stores the computer program.

Advantageous effects of the present invention are as follows:

according to the present application, the service name of a service (the first service) requesting to use the private data of the mobile terminal is amended so that when a request to use the service (the first service) is received, the user is first queried whether to permit the use of the private data of the mobile terminal, and in the event of the user's permission, the service (the first service) is called through an amended service name (the jump service name). As such, the application accesses to or uses of the private data of the mobile terminal each time can be known by the user and thereby the user decides whether to permit the application to use the private data, thereby solving the problem in the prior art that the user's private data cannot be effectively protected and the user's safety upon using the application is not high, and improving safety of the private data of the mobile terminal.

The above description is only generalization of technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF THE DRAWINGS

Various other advantages and merits will become apparent to those having ordinary skill in the art by reading through the following detailed description of preferred embodiments. Figures are only intended to illustrate preferred embodiments not to limit the present invention. In all figures, the same reference number denotes the same part. In the figures.

DETAILED DESCRIPTION OF THE INVENTION

The present invention will be further described below with reference to figures and specific embodiments.

Embodiment 1

Figure 1:
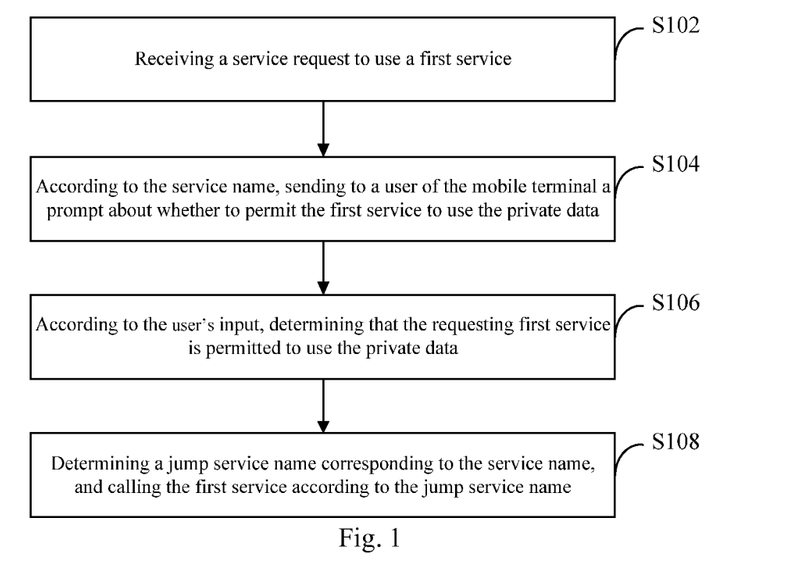
FIG. 1 is a flow chart of a data calling method according to Embodiment 1 of the present application.

Referring to FIG. 1, a flow chart of a data calling method according to Embodiment 1 of the present application is shown.

The data calling method according to this embodiment comprises the following steps:

Step S102: receiving a service request to use a first service.

Wherein, the first service needs to use private data of a mobile terminal, and the service request comprises a service name of the first service. The first service may be current service such as short message service, and the service name of the first service is an original service name of the current service such as ISMS, and so on.

In this step, it may be service (or called service process) of the system that receives the service request to use the private data of the mobile terminal.

Service is an abstract package. One service (or more services) corresponds to one process which is dedicated to do a certain thing and therefore called service process. Take android system as an example. The service process differs from the ordinary process in that the service process has an android-specific interface (service interface). Services of similar android systems may be classified into two types according to activation manners: services activated via android dalvik virtual machine and services activated not via android dalvik virtual machine. The latter may be called native service. Services activated not by the android virtual machine program of the system (e.g., 360callback service mentioned hereunder) cannot be registered into a service listing of the system via the interface of the system.

Step S104: according to the service name, sending to a user of the mobile terminal a prompt about whether to permit the first service to use the private data.

Since the first service needs to use the service-related private data in the mobile terminal, a service of the system sends to the user of the mobile terminal a prompt about whether to permit use of the service-related private data: on the one hand, to prompt the user that a service desires to use the private data; and on the other hand, the user decides whether he wants the private data to be used by the service.

Step S106: according to the user's input, determining that the requesting first service is permitted to use the private data.

Step S108: determining a jump service name corresponding to the service name, and calling the first service according to the jump service name.

Wherein, the jump service name is a service name after modification to the service name of the first service in the service listing (e.g., the service listing maintained by ServiceManager) maintained by the system whenever the mobile terminal activates each time, and the jump service name is different from service names of other services except for the first service in the service listing.

The jump service name is a new service name resulting from modification to the original service name of the first service, whereby the original service name is amended to the new service name so that the service is not directly called when a service is called, and instead, a prompt for using the private data is sent to the user first, and the service can be called only when the user permits use of the private data, thereby avoiding leakage and use of the private data without notice of the user.

According to the present embodiment, the service name of the service (the first service) using the mobile terminal's private data is modified; upon receipt of a request for using the service (the first service), the user is first queried about whether to permit use of the mobile terminal's private data; upon the user's permission, the service (the first service) is called through the modified service name (the jump service name). As such, the user is aware that the application accesses to or uses the mobile terminal's private data every time, and then the user decides whether to permit the application to use the private data, thereby solving the problem in the prior art that the user's private data cannot be effectively protected and the user's safety upon using the application is not high, and improving safety of the private data of the mobile terminal.

Embodiment 2

Figure 2:
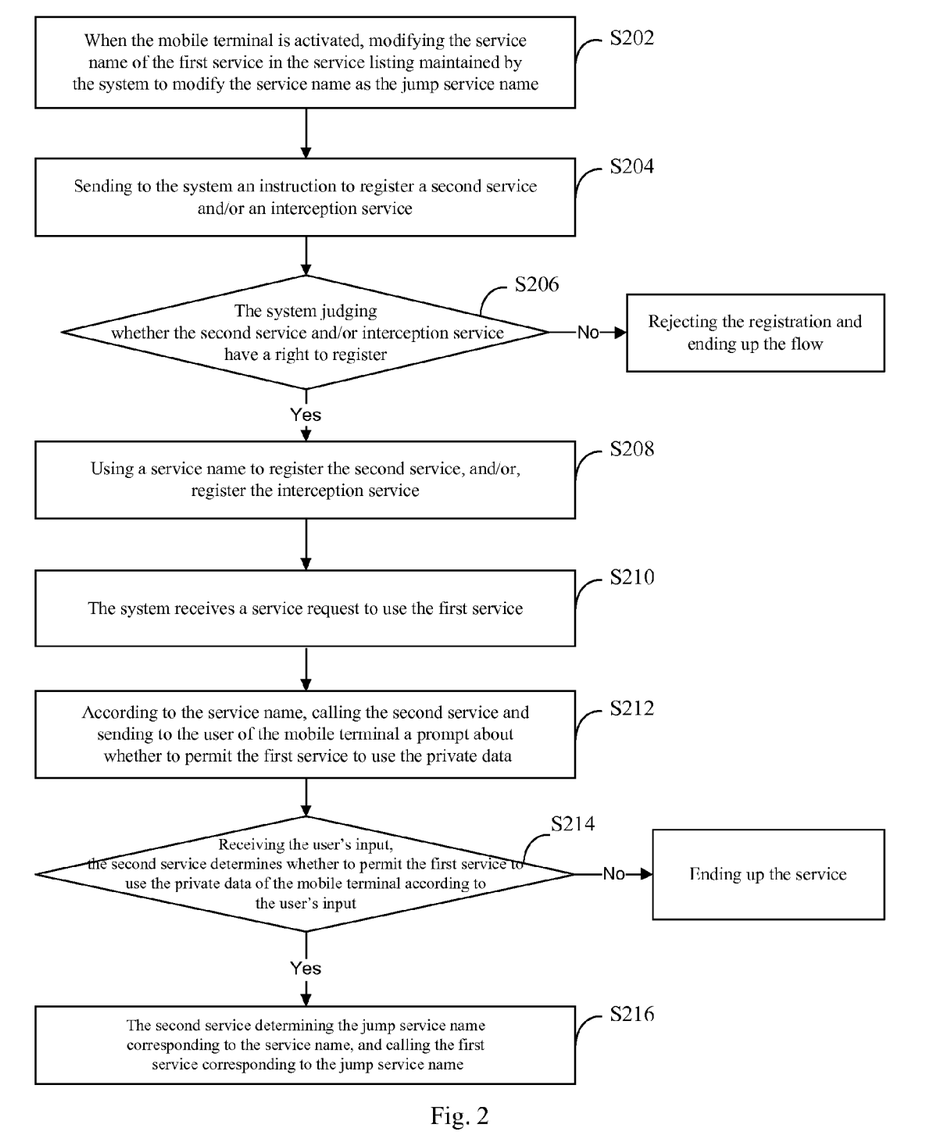
FIG. 2 is a flow chart of a data calling method according to Embodiment 2 of the present application.

Referring to FIG. 2, a flow chart of a data calling method according to Embodiment 2 of the present application is shown.

In the present embodiment, assume the mobile terminal use an Android operating system, assume the first service be a short message service which needs to use the private data of the mobile terminal, and assume that the service name of the first service be ISMS.

The data calling method according to the present embodiment comprises the following steps:

Step S202: when the mobile terminal is activated, modifying the service name of the first service in the service listing maintained by the system to modify the service name as the jump service name.

The "system" in this embodiment refers to a ServiceManager service management process in the Android system.

The jump service name resulting from modification to the first service is different from the original service name as well as service names of other services in the listing besides the first service.

In the present embodiment, through this step, the service name ISMS of the short message service may be modified to ISM0. "ISM0" is only for exemplary illustration. Under the aforesaid principle, those skilled in the art may modify the service name as any proper name. Preferably, the jump service name after the modification is identical with the service name in length. The service names remains the same length before and after modification so that data structure inside the program cannot be destroyed, overflow of program storage stack or other problems will not be caused, and the influence exerted by the modification to the current flow will be minimized.

Step S204: sending to the system an instruction to register a second service and/or an interception service.

Wherein the second service is used to send to the user of the mobile terminal a prompt about whether to permit the first service to use the private data, and according to the user's input, determine whether to permit the requesting first service to use the private data; or the second service is used to call the interception service, the interception service sends to the user of the mobile terminal a prompt about whether to permit the first service to use the private data, and after the user returns a processing result, the interception service returns the processing result to the second service.

It would need to note, interception and prompting of invocation of the private data may be implemented by those skilled in the art in other proper manners according to actual needs, without necessarily registering a new service, e.g., in a manner such as using a command or program turning.

Step S206: the system judging whether the second service and/or interception service have a right to register, and executing Step S208 if they have the right; rejecting the registration if they do not have the right, and ending up the flow.

The step is an optional step and mainly for users whose right is restricted, to avoid modification by mistake or unlawful modification and ensure security of the system.

Step S208: using a service name to register the second service, and/or, register the interception service.

In this embodiment, a new service named ISMS and/or the interception service are registered again.

Using the original service name to register the new service can effectively ensure the system stability so that the system, upon calling the original service, can directly find the original service name. Although the new service is executed, failure to execute the service because the original service name cannot be found, or other problems such as system halting or crash will not be caused.

When the second service or interception service may individually implement a function of sending to the user of the mobile terminal a prompt about whether to permit to use the private data, and determining, according to the user's input, whether on earth to permit the first service to use the private data, the second service or interception service may be registered individually; part of the above function may be separated, for example, the function of sending to the user of the mobile terminal a prompt about whether to permit to use the private data and receiving the user's input is separated and completed by the interception service. The second service calls the interception service, receives the user's input information returned by the interception service, and thereby determines whether to permit the first service to use the private data according to the user's input information and thereby achieves interception and prompting of the invocation of the private data.

Through registration of the second service and/or interception service, interception and prompting of the invocation of the private data are effectively implemented, and furthermore, the original service name is used to register the new name, which effectively ensures the stability of the system. By separating the interception service from the second service, respective service functions may be made clearer, current service functions can be effectively utilized, e.g., the current function of displaying an interception interface.

Preferably, the second service is further used to, after determining permitting the first service to use the private data, determine the jump service name corresponding to the service name, and call the first service corresponding to the jump service name. The second service determines the jump service name, and thereby calls the first service, which ensures coherence and consistency of service invocation. Of course, in actual implementation, the jump service name may be determined in other manners, and thereby the first service is called.

In this embodiment, assume that only the second service be registered, the second service individually implements a function of sending to the user of the mobile terminal a prompt about whether to permit to use the private data, and determining, according to the user's input, whether on earth to permit the first service to use the private data.

So far, in the present embodiment, the current service name of the short message service is ISM0, and the original service name ISMS is directed to a new service (second service) for intercepting and prompting use of the private data.

Step S210: the system receives a service request to use the first service.

The first service needs to use private data of a mobile terminal, and the service name of the first service can be acquired through the service request.

In this embodiment, the system server receives the service request to use the short e message service, and acquires that the service name of the short message service is ISMS.

Step S212: according to the service name, calling the second service and sending to the user of the mobile terminal a prompt about whether to permit the first service to use the private data.

After the second service is registered by using the service name, when the system receives the service name, the service name corresponding to the second service is looked up from the service listing maintained by the system so that the second service is called, and the prompt about whether to permit the first service to use the private data is sent to the user of the mobile terminal.

In this step, after the system receives the ISMS, the second service is directly called, and a prompt interface pops up to the user of the mobile terminal so that the user may select whether to permit use of his private data.

Step S214: receiving the user's input, the second service determines whether to permit the first service to use the private data of the mobile terminal according to the user's input, and executing Step S216 if in the event of permission; ending up the service in the event of no permission.

Step S216: the second service determining the jump service name corresponding to the service name, and calling the first service corresponding to the jump service name.

After the service name is modified, the system stores correspondence relationship between the service name and the jump service name. When the second service determines that the user permits the first service to use his private data, it directly finds a new service name (namely, the jump service name) corresponding to the original service name (namely, the service name), and thereby calls the original service (namely, the first service) corresponding to the new service name.

In this embodiment, the second service determines that the new service name corresponding to the original service name ISMS is ISM0, it looks up the service name ISM0 in the service listing and calls the short messaging service according to the original flow by the service name ISM0 to use the private data of the mobile terminal.

Preferably, in the data calling method according to the present embodiment, before the system receives the service request to use the first service, it is feasible to modify using the service name of the first service to call the first service to using the service name of the first service to instruct the mobile terminal to send to the user a prompt about whether to permit the first service to use the private data, according to the user's input, determine whether to permit the requesting first service to use the private data, and determine the jump service name corresponding to the service name of the first service.

Through this embodiment, the service name is modified in the storage. The modification is modification for parameter classes, not modification for system functions or file classes. This modification alters the system less, which not only ensures use security of the private data but also makes the altered system very stable. Furthermore, the stability of the system is further improved by using the original service name to register the new service and modifying the original service name to a new service name having the consistent length.

It needs to be noted that, the present embodiment takes the short message service as an example, but is not limited to this. Any other services requiring to use the private data, such as, IP telephone service or data uploading service, can all implement invocation of the private data of the mobile terminal by referring to the present embodiment.

Applying the data calling scheme of the present application to short message service, IP telephone service and data uploading service etc. achieves security protection of current services using the private data as much as possible, and achieves an effect that the user may use the current service at ease to a maximum extent and the user's experience in use is improved.

Embodiment 3

Figure 3:
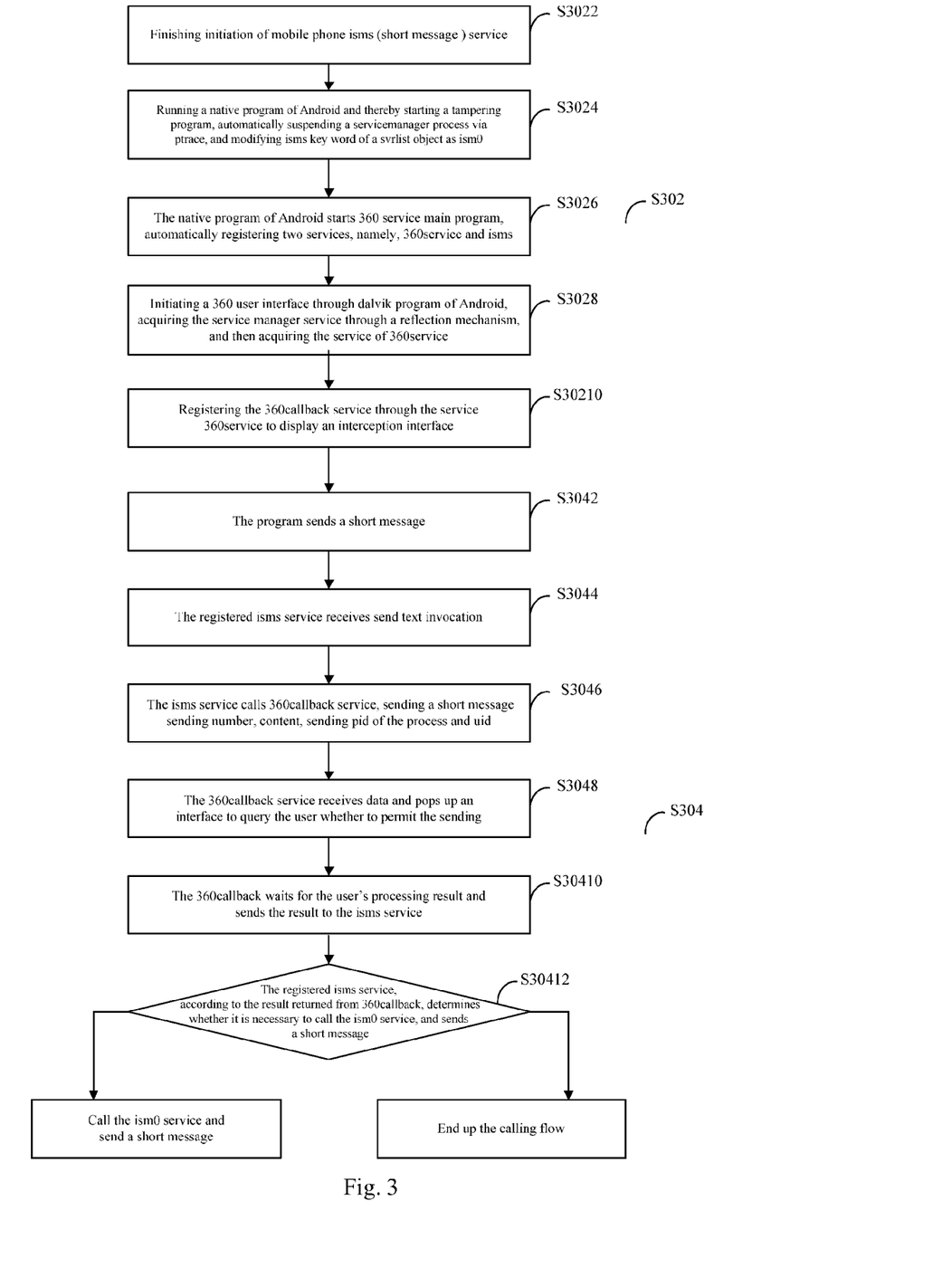
FIG. 3 is a flow chart of a data calling method according to Embodiment 3 of the present application.

Referring to FIG. 3, a flow chart of a data calling method according to Embodiment 3 of the present application is shown.

The present embodiment still takes the short message service using the private data of the mobile terminal as an example. In the present embodiment, the mobile terminal employs a mobile phone, and the mobile phone's operating system employs Android operating system.

In this embodiment, when the Android operating system is activated, it automatically starts an ISMS service at a system_server process of dalvik, processes all systems of Android through a Binder mechanism, performs data calling treatment of the present application for the ISMS service, and achieves the purpose of intercepting a short message by filtering short message-sending requests.

The data calling method according to the present embodiment comprises the following steps:

Step S302: the Android operating system starts the flow. The step specifically comprises:

Step S3022: finishing initiation of mobile phone isms (short message) service.

Step S3024: running a native program of Android and thereby starting a tampering program, automatically suspending a servicemanager process via ptrace, and modifying isms key word of a svrlist object as ism0.

Step S3026: the native program of Android starts 360 service main program, automatically registering two services, namely, 360service and isms. In the present embodiment, the system uses 360 service and controls registration of relevant services through 360service.

In fact, the tampering program is started after applying to the system for a root right, so the right obtained via the application may also be used to start the services 360service (name) and isms (native). As such, the service 360service has the root right, so the service 360 service has a right to approve registration of 360callback (dalvik) service. The 360callback (dalvik) service is a service at Java level. However, a service at Java level, by default, may not be registered to the service listing through a normal channel. Therefore, in this embodiment, it is enabled to be registered to the service listing of the system through the service 360service.

Step S3028: initiating a 360 user interface through dalvik program of Android, acquiring the service manager service through a reflection mechanism, and then acquiring the service of 360service.

Step S30210: registering the 360callback service through the service 360service to display an interception interface.

As stated above, the 360callback service is registered through the service of 360service because the service manager does not permit registration of services that are not of system and root identity.

Step S304: the flow of data calling work
Specifically, the step comprises:
Step S3042: the program sends a short message.
That is, requesting to call the short message service and use the private data in the mobile phone.

Step S3044: the registered isms service receives send text invocation, i.e., the newly-registered isms service acquires the short message service request of the program.

Step S3046: the isms service calls 360callback service, sending a short message sending number, content, sending pid (process identification) of the process and uid (user identification).

Step S3048: the 360callback service receives data and pops up an interface to query the user whether to permit the sending.

Prompt information of the pop-up interface further includes a prompt of using the private data.

Upon specific implementation, a white list mechanism for short message sending may be achieved through a proper current means.

Step S30410: the 360callback waits for the user's processing result and sends the result to the isms service.

Steps S30412: the registered isms service, according to the result returned from 360callback, determines whether it is necessary to call the ism0 service, and sends a short message; if necessary, call the ism0 service and send a short message; if not necessary, end up the calling flow.

Through servicemanager process tampering program (Android native), 360service and isms registration program (Android native) and 360callback service and interception interface program (apk), the present embodiment achieves the function of tampering servicemanager, registering the service of 360service, pseudo isms service and 360callback service, intercepting short messages, popping up an interception interface, and sending or not sending a short message according to the interception result.

Through the present embodiment, names of corresponding services in the service listing maintained by the system are only modified, then a pseudonym is registered so that when the application calls later, what is called is service of 360, rather than the service of the original system. The service of 360 will pop up a prompt interface. After the user agrees, 360 automatically calls the service of the original system which name is already changed, and does not bring about an influence on access to the private data. Therefore, this solves the problem in the prior art that the user's private data cannot be effectively protected and the user's safety upon using the application is not high, and improves safety of the private data of the mobile terminal.

It needs to be noted that, the present embodiment takes the mobile phone using Android system as an example, but the present invention is not limited to this. Any mobile terminal using the Android system, such as ipad, may use the data calling method according to the present invention. Furthermore, other systems similar to Android operating system may also implement the data calling method according to the present invention. Likewise, the data calling method is not limited to the mobile terminal using 360service, and mobile terminals using other similar services may also refer to the present invention to implement data invocation.

Embodiment 4

Figure 4:
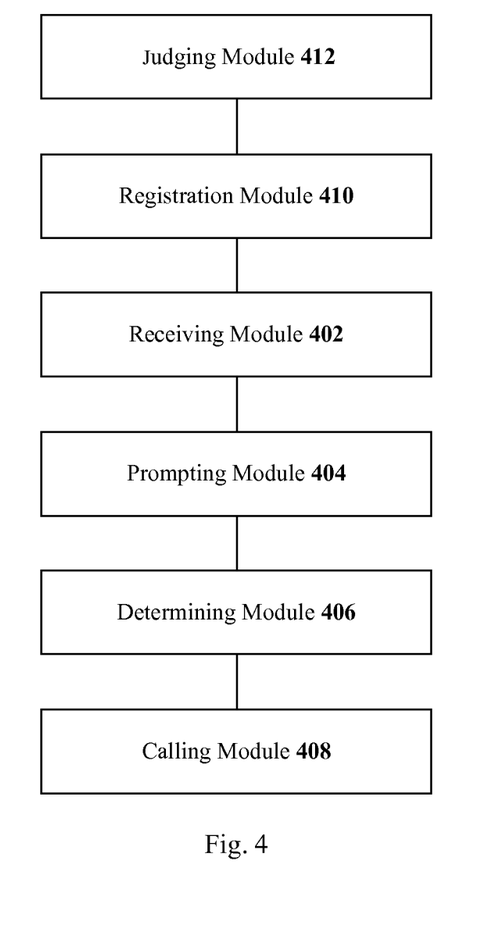
FIG. 4 is a structural block diagram of a data calling device according to Embodiment 4 of the present application.

Referring to FIG. 4, a structural block diagram of a data calling device according to Embodiment 4 of the present application is shown.

The data calling device according to the present embodiment comprises: a receiving module 402 configured to receive a service request to use a first service, wherein, the first service needs to use private data of a mobile terminal, and the service request comprises a service name of the first service; a prompting module 404 configured to, according to the service name, send to a user of the mobile terminal a prompt about whether to permit the first service to use the private data; a determining module 406 configured to, according to the user's input, determine that the requesting first service is permitted to use the private data; an calling module 408 configured to determine a jump service name corresponding to the service name after the determining module 406 determines that the requesting first service is permitted to use the private data, and call the first service according to the jump service name, wherein the jump service name is a service name resulting from modification to the service name of the first service in the service listing maintained by the system whenever the mobile terminal is activated, and the jump service name is different from service names of other services except for the first service in the service listing.

Preferably, the data calling device according to the present embodiment further comprises: a registration module 410 configured to, whenever the mobile terminal is activated, modify the service name of the first service in the service listing maintained by the system to the jump service name, use the service name to register a second service which is used to send to the user of the mobile terminal a prompt about whether to permit the first service to use the private data, and according to the user's input, determine whether to permit the requesting first service to use the private data. The prompting module 404 configured to, according to the service name, call the second service and through the second service send to the user of the mobile terminal a prompt about whether to permit the first service to use the private data.

Preferably, the second service is further configured to, after determining permitting the first service to use the private data, determine a jump service name corresponding to the service name, and call the first service according to the jump service name.

Preferably, the registration module 410 is further configured to register the interception service before or after using the service name to register the second service; the second service is configured to call the interception service to send to the user of the mobile terminal a prompt about whether to permit the first service to use the private data; and determine whether to permit the requesting first service to use the private data according to the user's input information returned from the interception service.

Preferably, the data calling device according to the present embodiment further comprises: a judging module 412 configured to, before the registration module 410 registers the second service and the interception service, judge whether the second service and interception service have a right to register, and permit registration if they have the right; reject the registration if they do not have the right.

Preferably, the data calling device according to the present embodiment further comprises: a modifying module (not shown in the figure) configured to, before the receiving module 402 receives the service request to use the first service, modify using the service name of the first service to call the first service to using the service name of the first service to instruct the mobile terminal to send to the user a prompt about whether to permit the first service to use the private data, according to the user's input, determine whether to permit the requesting first service to use the private data, and determine the jump service name corresponding to the service name of the first service.

Preferably, the length of the service name is identical with that of the jump service name.

Preferably, the mobile terminal uses Android operating system.

Preferably, the first service comprises at least one of short message service, IP telephone service and data uploading service.

The data calling device according to the present embodiment is used to implement a plurality of corresponding data calling methods as recited in aforesaid method embodiments, and achieves the same advantageous effects as in the corresponding method embodiments, which will not be detailed here any more.

Embodiments of the present description all are described in a progressive manner, reference may be made to identical or similar portions of embodiments, and each embodiment focuses on differences from other embodiments. Particularly, regarding embodiments regarding devices, since they are substantially similar to method embodiments, they are described relatively simply, and reference may be made to partial description of method embodiments.

Embodiments regarding parts in the present invention may be implemented in hardware, or implemented by one or more software modules running on a processor, or implemented in their combinations. Those skilled in the art should understand that a microprocessor or digital signal processor (DSP) may be used in practice to implement some or all functions of some or all parts of the device for detecting security of download link according to embodiments of the present invention. The present invention may also be implemented as an apparatus or device program (e.g., computer program and computer program product) for executing part or all methods described here. Such programs implementing the present invention may be stored in a computer-readable medium, or may be in a form having one or more signals. Such signals can be obtained by downloading from the Internet website, or provided on a carrier signal, or provided in any other form.

Figure 5:
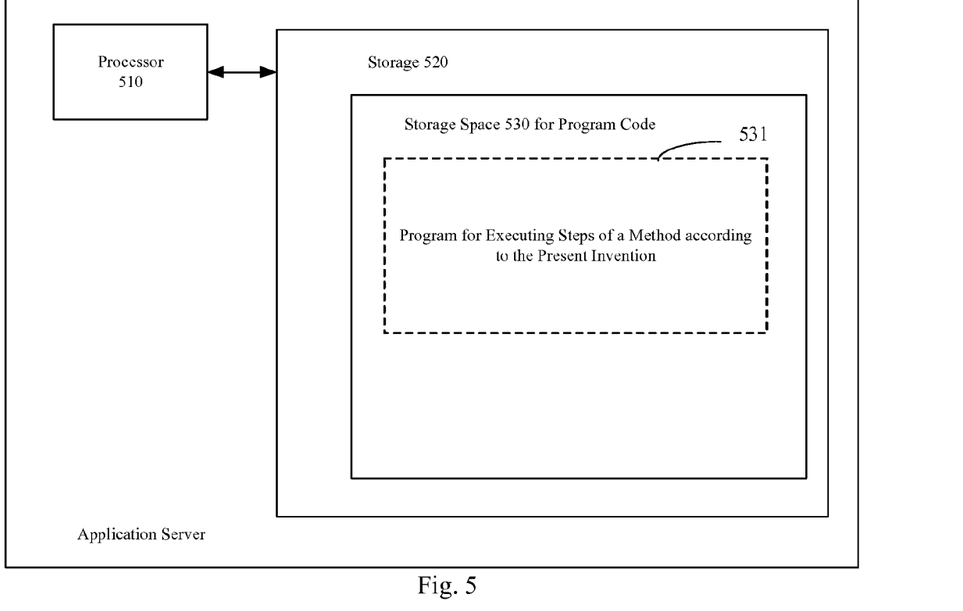
FIG. 5 schematically shows a block diagram of a server for executing the method according to the present invention.
Figure 6:
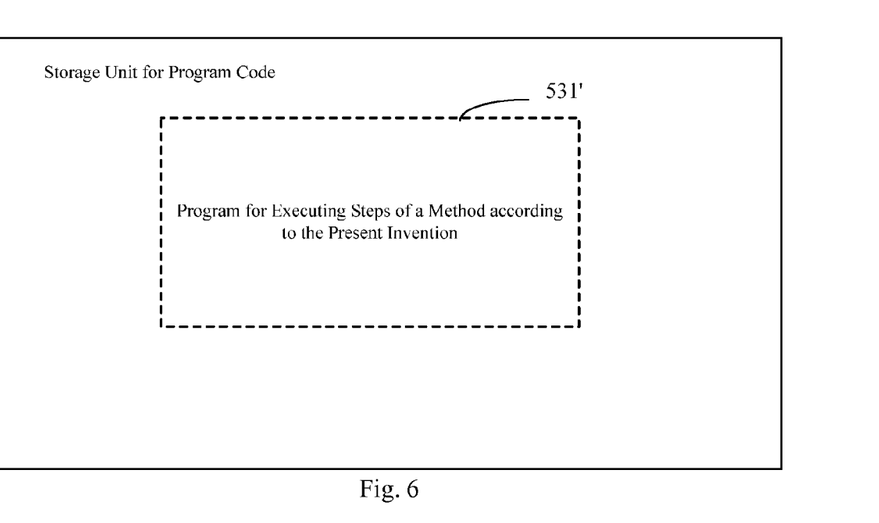
FIG. 6 schematically shows a memory unit for maintaining or carrying a program code for implementing the method according to the present invention.

For example, FIG. 5 illustrates a server, for example, an application server, which can implement the software installation method and/or device according to the present invention. The server conventionally comprises a processor 510 and a computer program product or computer-readable medium in the form of a storage 520. The storage 520 may be a flash memory, EEPROM (Electrically Erasable Programmable Read-Only Memory), EPROM, hard disk or ROM-like electronic memory. The storage 520 has a storage space 530 for a program code 531 for executing any step of the above method. For example, the storage space 530 for the program code may comprise program codes 531 respectively for implementing steps of the above method. These program codes may be read from one or more computer program products or written into one or more computer program products. These computer program products comprise program code carriers such as hard disk, compact disk (CD), memory card or floppy disk. Such computer program products are usually portable or fixed memory unit as shown in FIG. 6. The memory unit may have a storage segment, a storage space or the like arranged in a similar way to the storage 520 in the server of FIG. 5. The program code may for example be compressed in a suitable form. Usually, the memory unit includes a computer-readable code 531', namely, a code readable by a processor for example similar to 510. When these codes are run by the server, the server is caused to execute steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

The description as provided here describes a lot of specific details. However, it is appreciated that embodiments of the present invention may be implemented in the absence of these specific details. Some embodiments do not specify detail known methods, structures and technologies to make the description apparent.

It should be noted that the above embodiment illustrate the present invention but are not intended to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the apparatus claims enumerating several units, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims.

What is claimed is:

1. A data calling method in a mobile terminal, comprising:
    modifying an original service name of a first service in a service listing maintained by an operating system of the mobile terminal to a jump service name when the mobile terminal is activated, wherein the jump service name is different from service names of other services;
    receiving a service request to use the first service, wherein, the first service uses private data of the mobile terminal, and the service request comprises the original service name of the first service;
    using the original service name to register a second service;
    responsive to the service request to use the first service, calling the second service according to the original service name, wherein the second service sends to the mobile terminal a prompt about whether to permit the first service to use the private data;
    determining, by the second service, that the requesting first service is permitted to use the private data according to input of a user of the mobile terminal; and
    determining, by the second service, the jump service name corresponding to the original service name, and calling the first service according to the jump service name when it is determined that the first service is permitted to use the private data, wherein a length of the original service name is identical to a length of the jump service name.

2. The data calling method according to claim 1, further comprising:
    registering an interception service before or after using the original service name to register the second service; and
    the second service calling the interception service to send to the user of the mobile terminal a prompt about whether to permit the first service using the private data, and determining whether to permit the requesting first service using the private data according to input of the user returned from the interception service.

3. The data calling method according to claim 2, wherein before registering the second service and the interception service, the method further comprises:
    determining whether the second service and interception service have a right to register, and permitting registration if the second service and the interception service have the right to register, and rejecting the registration if the second service and the interception service do not have the right to register.

4. The data calling method according to claim 1, wherein the mobile terminal uses Android operating system.

5. The data calling method according to claim 1, wherein before the receiving the service request to use the first service, the method further comprises:
    modifying using the original service name of the first service to call the first service to using the original service name of the first service to instruct the mobile terminal to send to the user a prompt about whether to permit the first service to use the private data, and according to the input of the user, determining whether to permit the requesting first service to use the private data, and determining the jump service name corresponding to the original service name of the first service.

6. The data calling method according to claim 1, wherein the first service comprises at least one of a short message service, an internet protocol (IP) telephone service, and a data uploading service.

7. A data calling device in a mobile terminal, comprising:
a memory having instructions stored thereon;
and a processor to execute the instructions to perform operations for data calling, the operations comprising:
modifying an original service name of a first service in a service listing maintained by an operating system of the mobile terminal to a jump service name when the mobile terminal is activated, wherein the jump service name is different from service names of other services;
receiving a service request to use the first service, wherein the first service uses private data of the mobile terminal, and the service request comprises the original service name of the first service;
using the original service name to register a second service;
responsive to the service request to use the first service, calling the second service according to the original service name, wherein the second service sends to the mobile terminal a prompt about whether to permit the first service to use the private data;
determining, by the second service, that the requesting first service is permitted to use the private data according to input of a user of the mobile terminal; and
determining, by the second service, the jump service name corresponding to the original service name, and calling the first service according to the jump service name when it is determined that the first service is permitted to use the private data, wherein a length of the original service name is identical to a length of the jump service name.

8. The data calling device according to claim 7, wherein the operations further comprise:
registering an interception service before or after using the original service name to register the second service; and
the second service calling the interception service to send to the user of the mobile terminal a prompt about whether to permit the first service to use the private data, and determining whether to permit the requesting first service to use the private data according to input of the user returned from the interception service.

9. The data calling device according to claim 8, wherein the operations further comprise:
before registering the second service and the interception service, determining whether the second service and interception service have a right to register, and permitting registration if the second service and the interception service have the right to register, and rejecting the registration if the second service and the interception service do not have the right to register.

10. The data calling device according to claim 7, wherein the mobile terminal uses Android operating system.

11. The data calling device according to claim 7, wherein the operations further comprise:
before the receiving the service request to use the first service, modifying using the original service name of a first server to call the first service to using the original service name of the first server to instruct the mobile terminal to send to the user a prompt about whether to permit the first service to use the private data, and according to the input of the user, determining whether to permit the requesting first service to use the private data, and determining the jump service name corresponding to the original service name of the first service.

12. The data calling device according to claim 7, wherein the first service comprises at least one of a short message service, an internet protocol (IP) telephone service, and a data uploading service.

13. A non-transitory computer readable medium comprising instructions stored thereon that, when executed by a server, cause the server to perform data calling operations, the data calling operations comprising:
modifying an original service name of a first service in a service listing maintained by an operating system of a mobile terminal to a jump service name when the mobile terminal is activated, wherein the jump service name is different from service names of other services;
receiving a service request to use the first service, wherein, the first service uses private data of the mobile terminal, and the service request comprises the original service name of the first service;
using the original service name to register a second service;
responsive to the service request to use the first service, calling the second service according to the original service name, wherein the second service sends to the mobile terminal a prompt about whether to permit the first service to use the private data;
determining, by the second service, that the requesting first service is permitted to use the private data according to input of a user of the mobile terminal; and
determining, by the second service, the jump service name corresponding to the original service name, and calling the first service according to the jump service name when it is determined that the first service is permitted to use the private data, wherein a length of the original service name is identical to a length of the jump service name.

* * * * *